US011368318B2

(12) United States Patent
Cunningham et al.

(10) Patent No.: US 11,368,318 B2
(45) Date of Patent: Jun. 21, 2022

(54) GROUP IDENTIFICATION SYSTEM

(71) Applicant: Massachusetts Institute of Technology, Cambridge, MA (US)

(72) Inventors: Robert Cunningham, Lexington, MA (US); Richard Shay, Norwood, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 115 days.

(21) Appl. No.: 16/050,114

(22) Filed: Jul. 31, 2018

(65) Prior Publication Data

US 2020/0044870 A1 Feb. 6, 2020

(51) Int. Cl.
*H04L 29/06* (2006.01)
*H04L 9/32* (2006.01)
*H04L 9/08* (2006.01)

(52) U.S. Cl.
CPC .......... *H04L 9/3271* (2013.01); *H04L 9/0866* (2013.01); *H04L 9/3231* (2013.01)

(58) Field of Classification Search
CPC .... H04L 9/3271; H04L 9/0866; H04L 9/3231
See application file for complete search history.

(56) References Cited

U.S. PATENT DOCUMENTS

| | | | |
|---|---|---|---|
| 9,876,796 B2 | 1/2018 | Egan et al. | |
| 2006/0253771 A1* | 11/2006 | Baschy | G06F 21/6218 715/234 |
| 2007/0236330 A1 | 10/2007 | Cho et al. | |
| 2012/0243681 A1* | 9/2012 | Francis | H04L 9/0833 380/44 |
| 2015/0142689 A1* | 5/2015 | Squires | G06Q 30/0279 705/329 |
| 2016/0045825 A1* | 2/2016 | Kehoe | A63F 13/31 463/29 |
| 2017/0262697 A1* | 9/2017 | Kaps | A63F 13/812 |
| 2018/0376149 A1* | 12/2018 | Zhang | H04N 19/182 |

OTHER PUBLICATIONS

Das, Sauvik, Gierad Laput, Chris Harrison, and Jason I. Hong. "Thumprint: Socially-Inclusive Local Group Authentication Through Shared Secret Knocks." In Proceedings of the 2017 CHI Conference on Human Factors in Computing Systems, pp. 3764-3774. ACM, 2017.

Yang, Junshuang, Yanyan Li, and Mengjun Xie. "MotionAuth: Motion-based authentication for wrist worn smart devices." In Pervasive Computing and Communication Workshops (PerCom Workshops), 2015 IEEE International Conference on, pp. 550-555. IEEE, 2015.

(Continued)

*Primary Examiner* — Jeffrey C Pwu
*Assistant Examiner* — Rodman Alexander Mahmoudi
(74) *Attorney, Agent, or Firm* — Occhiuti & Rohlicek LLP

(57) ABSTRACT

A method for identifying a group of users from a number of users includes receiving, for each user of the number of users, response data including motion data characterizing motion of the user during a prescribed time period occurring after issuance of a challenge to the number of users, processing the motion data of the number of users to identify a first subset of the number of users with substantially matching motion data, and forming the group of users to include the first subset of the number of users.

18 Claims, 8 Drawing Sheets

(56) References Cited

OTHER PUBLICATIONS

Roshandel, Mehran. "Multi-factor authentication based on movement and gesture." (2017).

Liang, Guan-Cheng, Xiang-Yu Xu, and Jia-Di Yu. "User-Authentication on Wearable Devices Based on Punch Gesture Biometrics." In ITM Web of Conferences, vol. 11, p. 01003. EDP Sciences, 2017.

Abu Sayeed Mondol, M., et al.; "User authentication using wrist-mounted inertial sensors", 2017 16th ACM/IEEE International Conference on Information Processing in Sensor Networks (IPSN), Apr. 18-20, 2017, Los Alamitos, CA, USA, IEEE Computer Society.

Ahmed, I., et al.; "Checksum gestures: Continuous gestures as an out-of-band channel for secure pairing" 3rd ACM International Joint Conference on Pervasive and Ubiquitous Computing, UbiComp 2015, Sep. 7, 2015-Sep. 11, 2015, Osaka, Japan, Association for Computing Machinery, Inc.

Aumi, M. T. I. and S. Kratz ; "AirAuth: A biometric authentication system using in-air hand gestures" 32nd Annual ACM Conference on Human Factors in Computing Systems, CHI EA 2014, Apr. 26, 2014-May 1, 2014, Toronto, ON, Canada, Association for Computing Machinery.

Berci, N. and P. Szolgay; "Vision based human-machine interface via hand gestures," European Conference on Circuit Theory and Design 2007, ECCTD 2007, Aug. 26, 2007-Aug. 30, 2007, Seville, Spain, IEEE Computer Society.

Chen, X., et al., "User authentication mechanism based on secure positioning system in RFID communication," 8th International Conference on Ubiquitous Information Technologies and Applications, CUTE 2013, Dec. 18, 2013-Dec. 20, 2013, Danang, Viet nam, Springer Verlag.

Chenyu, H., et al., "Signing in the Air w/o Constraints: Robust Gesture-Based Authentication for Wrist Wearables," 2017 IEEE Global Communications Conference (GLOBECOM 2017), Dec. 4-8, 2017, Piscataway, NJ, USA, IEEE.

Ducray, B., et al., "Gesture recognition implemented on a personal limited device" 2017 8th International Conference on Information and Communication Systems, ICICS 2017.

Duo, L., et al., "A data driven in-air-handwriting biometric authentication system," 2017 IEEE International Joint Conference on Biometrics (IJCB), Oct. 1-4, 2017, Piscataway, NJ, USA, IEEE.

Echeverria, S., et al., "Establishing trusted identities in disconnected edge environments," Proceedings—1st IEEE/ACM Symposium on Edge Computing, SEC 2016.

Halford, T. R., "How to prove yourself to multiple parties: Energy-efficient multi-group authentication," 2013 IEEE Military Communications Conference, MILCOM 2013, Nov. 18, 2013-Nov. 20, 2013, San Diego, CA, United states, Institute of Electrical and Electronics Engineers Inc.

Imura, S. and H. Hosobe, "Biometric authentication using the motion of a hand," 4th Symposium on Spatial User Interaction, SUI 2016, Oct. 15, 2016-Oct. 16, 2016, Tokyo, Japan, Association for Computing Machinery, Inc.

Junshuang, Y., et al., "MotionAuth: motion-based authentication for wrist worn smart devices," 2015 IEEE International Conference on Pervasive Computing and Communication Workshops (PerCom Workshops), Mar. 23-27, 2015, Piscataway, NJ, USA, IEEE.

Krishna, P. K., et al., "Multi user authentication protocol using visual sceret sharing," 2016 International Conference on Inventive Computation Technologies, ICICT 2016, Aug. 26, 2016-Aug. 27, 2016, Coimbatore, India, Institute of Electrical and Electronics Engineers Inc.

Kwon, B., et al., "Implementation of human action recognition system using multiple kinect sensors," 16th Pacific-Rim Conference on Multimedia, PCM 2015, Sep. 16, 2015-Sep. 18, 2015, Gwangju, Korea, Republic of, Springer Verlag.

Li, S., et al., "Demo of Headbanger: Authenticating smart wearable devices using unique head movement patterns," 2016 IEEE International Conference on Pervasive Computing and Communication Workshops, PerCom Workshops 2016.

Li, S., et al., "Whose move is it anyway? Authenticating smart wearable devices using unique head movement patterns," 2016 IEEE International Conference on Pervasive Computing and Communications, PerCom 2016.

Liu, C., et al., "Where usability and security go hand-in-hand: Robust gesture-based authentication for mobile systems," Conference on Human Factors in Computing Systems—Proceedings (2017).

Liu, H., et al., "Gesture-based NUI application for real-time path modification," 11th IEEE International Conference on Dependable, Autonomic and Secure Computing, DASC 2013, Dec. 21, 2013-Dec. 22, 2013, Chengdu, Sichuan, China, IEEE Computer Society.

Maruyama, K., et al., "User authentication using leap motion," 2017 International Conference on Research in Adaptive and Convergent Systems, RACS 2017, Sep. 20, 2017-Sep. 23, 2017, Krakow, Poland, Association for Computing Machinery, Inc.

Maurer, M.-E., et al., "BroAuth: Evaluating different levels of visual feedback for 3D gesture-based authentication," 2012 International Working Conference on Advanced Visual Interfaces, AVI 2012, May 21, 2012-May 25, 2012, Capri Island, Italy, Association for Computing Machinery.

Nomura, K., et al., "Multi-group signature scheme for simultaneous verification by neighbor services," IEICE Transactions on Information and Systems E100D(8): 1770-1779, (2017).

Noronha, S. J., et al., "Architecture for synchronous multiparty authentication using biometrics," 4th International Conference on Audio and Video-Based Biometric Person Authentication, AVBPA 2003, Jun. 9, 2003-Jun. 11, 2003, Guildford, United kingdom, Springer Verlag.

Parimi, G. M., et al., "Analysis of head and torso movements for authentication," 2018 IEEE 4th International Conference on Identity, Security, and Behavior Analysis (ISBA), Jan. 11-12, 2018, Piscataway, NJ, USA, IEEE.

Piekarczyk, M. and M. R. Ogiela, "The touchless person authentication using gesture-types emulation of handwritten signature templates," 2015 10th International Conference on Broadband and Wireless Computing, Communication and Applications (BWCCA), Nov. 4-6, 2015, Los Alamitos, CA, USA, IEEE Computer Society.

Sajid, H. and S. C. S. Cheung, "VSig: Hand-gestured signature recognition and authentication with wearable camera," 2015 IEEE International Workshop on Information Forensics and Security (WIFS), Nov. 16-19, 2015, Piscataway, NJ, USA, IEEE.

Shi, L., et al., "ASK-BAN: Authenticated secret key extraction utilizing channel characteristics for Body Area Networks," 6th ACM Conference on Security and Privacy in Wireless and Mobile Networks, WiSec 2013, Apr. 17, 2013-Apr. 19, 2013, Budapest, Hungary, Association for Computing Machinery.

Shi, L., et al., "MASK-BAN: Movement-aided authenticated secret key extraction utilizing channel characteristics in body area networks," IEEE Internet of Things Journal 2(1): 52-62 (2015).

Shirkhodaie, A., et al., "Hand gesture recognition in confined spaces with partial observability and occultation constraints," Signal Processing, Sensor/Information Fusion, and Target Recognition XXV, Apr. 18, 2016-Apr. 20, 2016, Baltimore, MD, United states, SPIE.

Soneda, K., et al., "Simultaneous Authentication System for Cooperation Verification," International Journal of Information and Electronics Engineering 5(6): 446-449, (2015).

Sreeramareddy, L., et al., "Investigating the Use of Gesture-Based Passwords by the Seniors," Human Aspects of Information Security, Privacy and Trust. Third International Conference, HAS 2015, held as part of HCI International 2015, Aug. 2-7, 2015, Cham, Switzerland, Springer International Publishing.

Strachan, S. and S. Paneels, "ViSecure: A haptic gesture authentication system," 10th International Conference on Haptics: Perception, Devices, Control, and Applications, EuroHaptics 2016, Jul. 4, 2016-Jul. 7, 2016, London, United kingdom, Springer Verlag.

Tsudik, G. and S. Xu, "A flexible framework for secret handshakes: (Multi-party anonymous and un-observable authentication)," 6th International Workshop on Privacy Enhancing Technologies, PET 2006, Jun. 28, 2006-Jun. 30, 2006, Cambridge, United kingdom, Springer Verlag.

Wu, Y., et al., "Research on gesture cryptographic platform based on trusted computing," 2010 International Conference on Optics, Pho-

(56) References Cited

OTHER PUBLICATIONS tonics and Energy Engineering, OPEE 2010, May 10, 2010-May 11, 2010, Wuhan, China, IEEE Computer Society.

Yang, Y.-g. and H.-p. Chai, "A trusted multi-party authentication scheme based on proactive-ElGamal threshold secret sharing system," Applied Mechanics and Materials 235: 20-24, (2012).

Yang, Y., et al., "Free-form gesture authentication in the wild," Conference on Human Factors in Computing Systems—Proceedings (2016).

Yang, Y., et al., "Multiparty simultaneous quantum identity authentication with secret sharing," Science in China Series G (Physics, Mechanics and Astronomy) 51(3): 321-327, (2008).

Zeng, Y., et al., "WearIA: Wearable device implicit authentication based on activity information," 18th IEEE International Symposium on A World of Wireless, Mobile and Multimedia Networks, WoWMoM 2017—Conference, (2017).

Zhang, L., et al., "Human recognizer: An ECG based live biometric fingerprint," PAMCO 2016—Proceedings of the 2nd MobiHoc International Workshop on Privacy-Aware Mobile Computing, (2016).

\* cited by examiner

GROUP IDENTIFICATION SYSTEM

STATEMENT AS TO FEDERALLY SPONSORED RESEARCH

This invention was made with Government support under Grant No. FA8702-15-D-0001 awarded by the U.S. Air Force. The Government has certain rights in the invention.

BACKGROUND

This invention relates to systems and methods for group identification.

There exist situations where a group of users are participating in common activities or are sharing common resources. Some activities and resources require that users in the group possess devices and that each user-device pair in the group is initially authenticated or at least registered as being part of the group. In conventional systems, to initially authenticate and/or register user-device pairs, the users in the group typically enter (e.g., using a keyboard) or upload (e.g., from a USB stick) a secret group key or code that that associates the user-device pair with the group.

SUMMARY

Conventional techniques for initially authenticating and/or registering user-device pairs with a group are both time consuming, error-prone, and often require special purpose hardware that is not needed at other times (e.g., a connector for a key fill device or a keyboard and connector). For example, having every soldier in a squad of soldiers (e.g., ten or more soldiers) pass around a key fill device to upload a secret group key into a device (e.g., a communication device) is an arduous and time-consuming task. Similarly, having every soldier enter a common code into a device often results in at least some of the soldiers entering an incorrect code into the device and unsuccessfully authenticating the soldier-device pair with the squad group.

Aspects described herein perform an initial authentication and/or registration of user-device pairs with a group by requiring the users in the group to, after receiving a challenge (e.g., an air horn blast) substantially synchronously perform a previously agreed upon physical routine (e.g., a dance). User-device pairs that perform the physical routine within a predefined time period after the challenge are authenticated and/or registered with the group, while any user-device pairs that do not perform the physical routine within a predefined time period after the challenge are not authenticated and/or registered with the group.

In a general aspect, a method for identifying a group of users from a number of users includes receiving, for each user of the number of users, response data including motion data characterizing motion of the user during a prescribed time period occurring after issuance of a challenge to the number of users, processing the motion data of the number of users to identify a first subset of the number of users with substantially matching motion data, and forming the group of users to include the first subset of the number of users.

Aspects may include one or more of the following features.

Processing the motion data may include comparing the motion data to a motion data template and including users with motion data that substantially matches the motion data template in the first subset of the number of users. Processing the motion data may include comparing the motion data associated with each user with the motion data associated with other users. The method may include sharing a secret physical routine with the subset of users prior to issuance of the challenge, wherein the users in the subset of users is required to perform the secret physical routine within the prescribed time period after issuance of the challenge to be identified as members of the group of users. The secret physical routine may include one or more of dancing, whistling, jumping up and down, paced breathing, gesturing, muscle tensing, heart rate modulation, eye blinking, hand movement, clapping, and waving.

The method may include causing issuance of the challenge to the number of users. The challenge may include one or more of an audible challenge, a tactile challenge, a visual challenge, and a temporal challenge. Processing the motion data may include performing a pattern matching procedure. Processing the motion data may include determining a similarity metric for the motion data. Determining the similarity metric may include determining a mean squared difference between the motion data.

The method may include pre-processing the motion data including one or more of time aligning the motion data, warping the motion data, or rotating the motion data. For each user of the number of users, the response data may include a unique identifier associated with the user. The unique identifier may include a public encryption key associated with the user. The method may include distributing a cryptographic key to the first subset of users included in the group. The cryptographic key may be encrypted such that users in the first subset of users are able to decrypt the encrypted cryptographic key.

Each user of the number of users may be associated with a corresponding device, the corresponding device configured to collect the motion data for the user, form the response data for the user, and transmit the response data. The corresponding device may include one or more sensors. The one or more sensors may include an accelerometer. The motion data may include acceleration data. The corresponding device may include one or more of a biometric sensor, a radar sensor, a force sensor, an acoustic transducer, and a light sensor.

The method may include determining that at least some users of the number of users that were expected to be in the first subset of users were not identified as being part of the first subset of users. The method may include excluding one or more users of the number of users from the first group based on the one or more users not being identified as part of the first subset of users.

In another general aspect, a system for identifying a group of users from a number of users includes a group identification device including an input for receiving, for each user of the number of users, response data including motion data characterizing motion of the user during a prescribed time period occurring after issuance of a challenge to the number of users, and computing circuitry configured to process the motion data of the number of users to identify a first subset of the number of users with substantially matching motion data, and form the group of users to include the first subset of the number of users.

Aspects may have one or more of the following advantages.

Aspects are able to quickly perform authentication and/or registration of users into a group without requiring time-consuming tasks such as passing around key filling devices and without performing error-prone tasks such as entering codes into devices.

Other features and advantages of the invention are apparent from the following description, and from the claims.

DESCRIPTION

1 Overview

Figure 1:
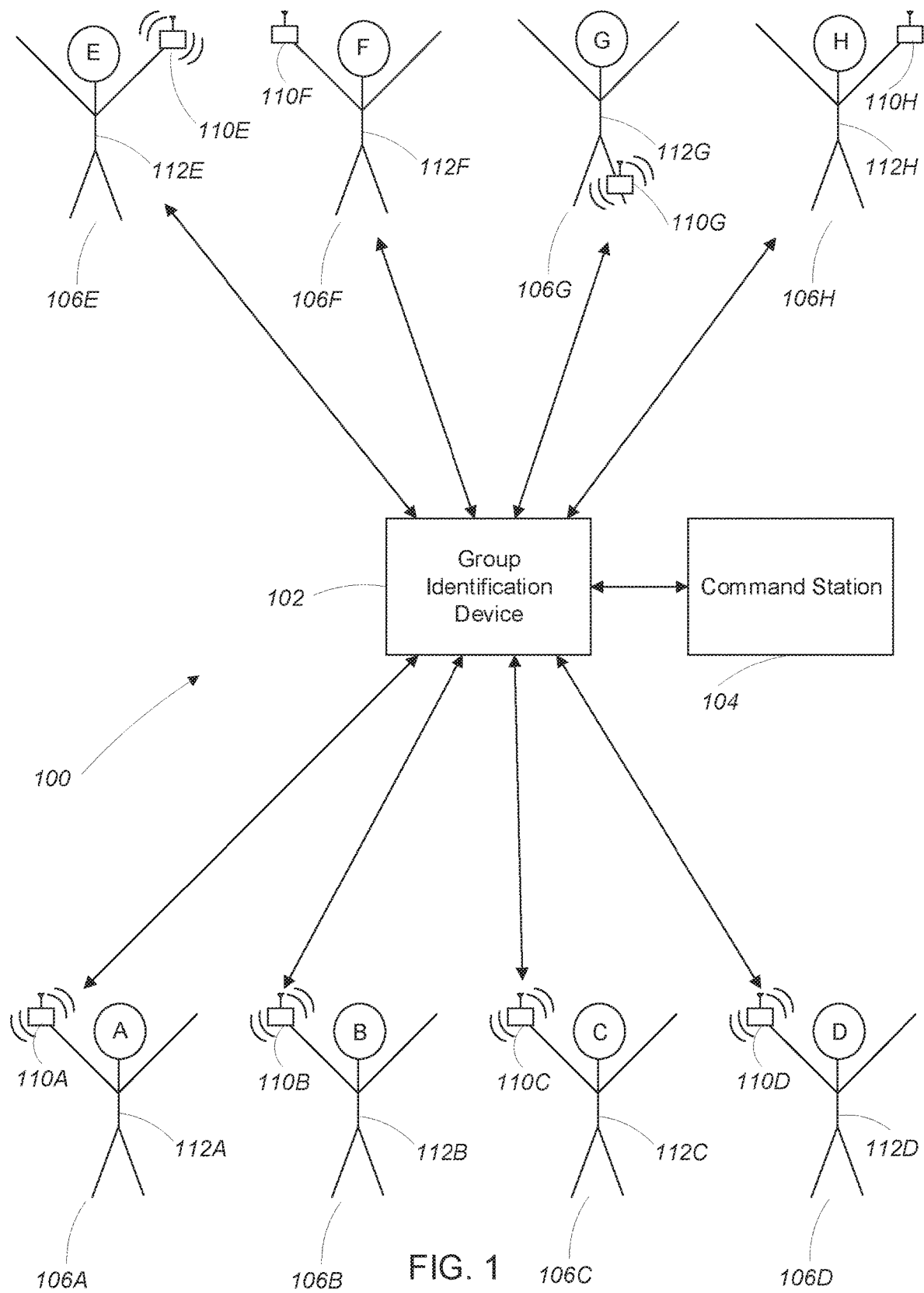
FIG. 1 is a group identification system.

Referring to FIG. 1, a group identification system 100 includes a group identification device 102 in communication with a command station 104 and a number of user-device pairs 106A-106H. Very generally, the group identification device 102 is configured to authenticate and/or register user-device pairs 106A-106H with one or more groups based on data representing physical activity substantially synchronously performed by the user-device pairs 106A-106H.

As is described in greater detail below, prior to issuance of a challenge to the user-device pairs 106A-106H, those users that belong to a group are made aware of a physical routine that they must perform to be authenticated and/or registered with the group. A user (not shown) at the command station 104 initiates issuance of a challenge to the user-device pairs. Users 112A-112H of the user-device pairs 106A-106H that are aware of the physical routine perform the physical routine within a predefined time period, t (e.g., 3 seconds) after issuance of the challenge. Devices 110A-110H attached to the users 112A-110H record a representation of the users' motion during their performance of the physical routine. The user device-pairs 106A-106H transmit response data including the recorded representation of the users' motion to the group identification device 102 and those user-device pairs with response data that sufficiently matches template motion data associated with the physical routine are authenticated and/or registered into groups with one another.

2 Device Provisioning

Figure 2:
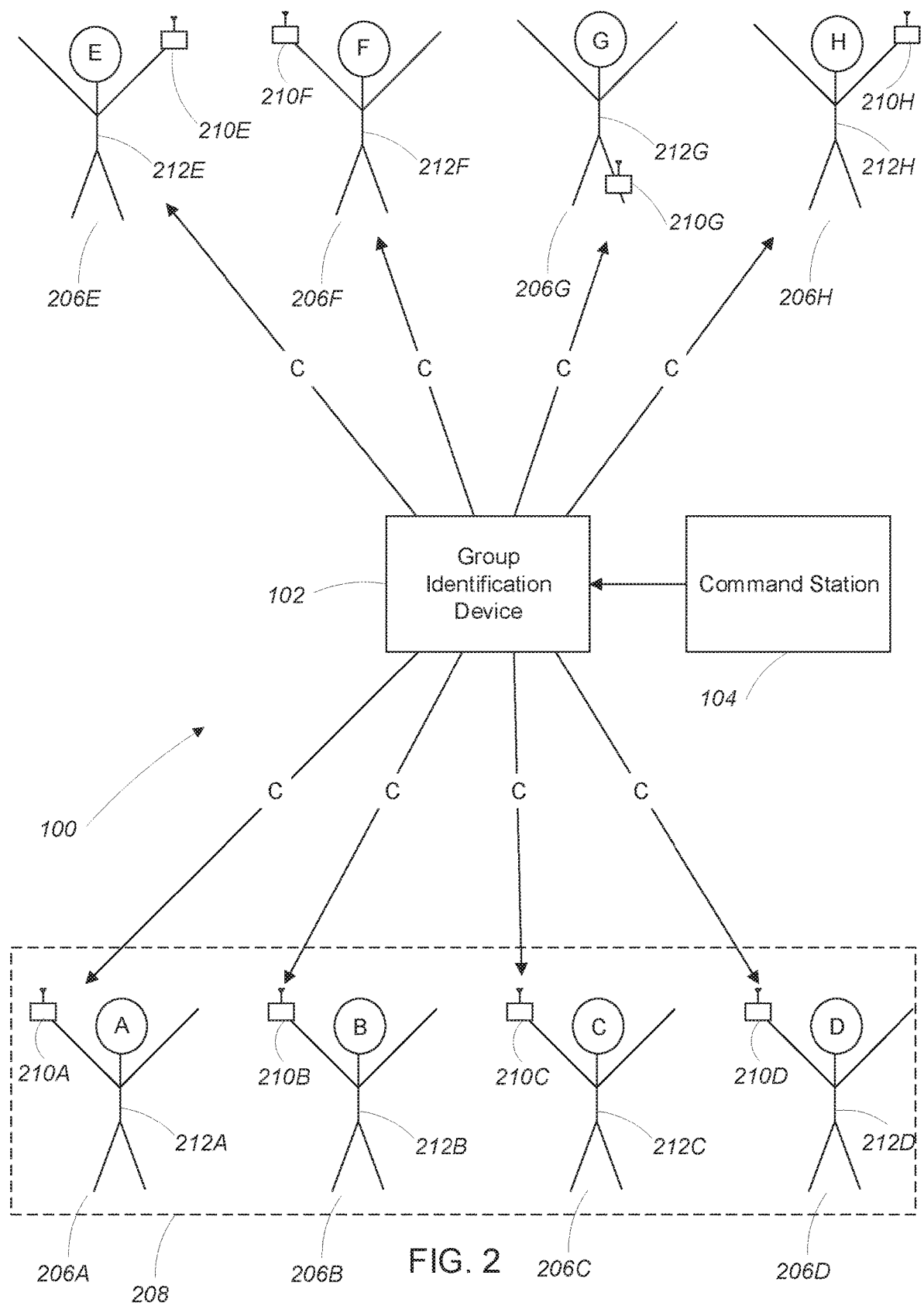
FIG. 2 is the group identification system of FIG. 1 issuing a challenge.

Referring to FIG. 2, in one example, the users are soldiers and the group identification system 100 is configured to authenticate soldier-device pairs into a first squad's group 208. Soldier-device pairs that are part of the first squad's group 208 are provisioned to communicate with each other over an encrypted radio communication channel (not shown), while those soldier-device pairs that are not part of the first squad's group 208 are unable access the content of the encrypted radio communication channel.

In this example, each of the soldier-device pairs 206A-206H includes a device 210 attached to a soldier's body 212. In some examples, the device 210 is a communication device (e.g., a radio or telephone) that includes a motion sensor such as an accelerometer from which motion data is recorded.

A first soldier 212A of a first soldier-device pair 206A, a second soldier 212B of a second soldier-device pair 206B, a third soldier 212C of a third soldier-device pair 206C, and a fourth soldier 212D of a fourth soldier-device pair 206D are part of a first squad and have all previously been made aware of a physical routine that must be performed within a predefined time period, t, after a challenge is issued in order to be authenticated into the first squad's group 208. In this simple example, the physical routine includes the soldiers making a waving motion with their right hand. Of course, other, more complex physical routines are likely to be used. Indeed, more complex physical routines may be required to ensure that motion data measured by devices attached to the soldiers' bodies can be identified as being associated with a particular physical routine without a significant risk of motion data being misidentified as being associated with the particular physical routine (i.e., a false positive). But in this case, for the sake of simplicity, the physical routine is described as a waving motion with a right hand.

A fifth soldier 212E of a fifth soldier-device pair 206E, a sixth soldier 212F of a sixth soldier-device pair 206F, a seventh soldier 212G of a seventh soldier-device pair 206G, and an eighth soldier 212H of an eighth soldier-device pair 206H are not aware of the physical routine required to join the first squad's group 208. Nonetheless, the fifth soldier 212E and the seventh soldier 212G have a desire to join the first squad's group 208 to eavesdrop, even though those soldiers are not authorized to do so. For example, the fifth soldier 212E and the seventh soldier 212G may be enemy soldiers that would like to have access to the squad's encrypted radio communication channel.

The sixth soldier 212F and the eighth soldier 212H are also not aware of the physical routine required to join the first squad's group 208 but have no desire to join the first squad's group 208. For example, the sixth soldier 212F and the eighth soldier 212H are friendly soldiers from a second, different squad.

To begin identifying and authenticating the first squad's group 208, the group identification device 102 causes a challenge, C, to be broadcast. The challenge signals, to the soldier-device pairs 206A-206H, that they must perform the physical routine within the predefined time period, t, after receiving the challenge in order to be authenticated into the first squad's group 208. One example example of the challenge, C, is the blowing of an air horn. But, other examples are possible including but not limited to a signal that causes each soldier's device to buzz or emit a sound, an audible command such as "Group One, perform activity!," a visual command such as a blinking light, or any other signal suitable to elicit a response from the soldier-device pairs.

Figure 3:
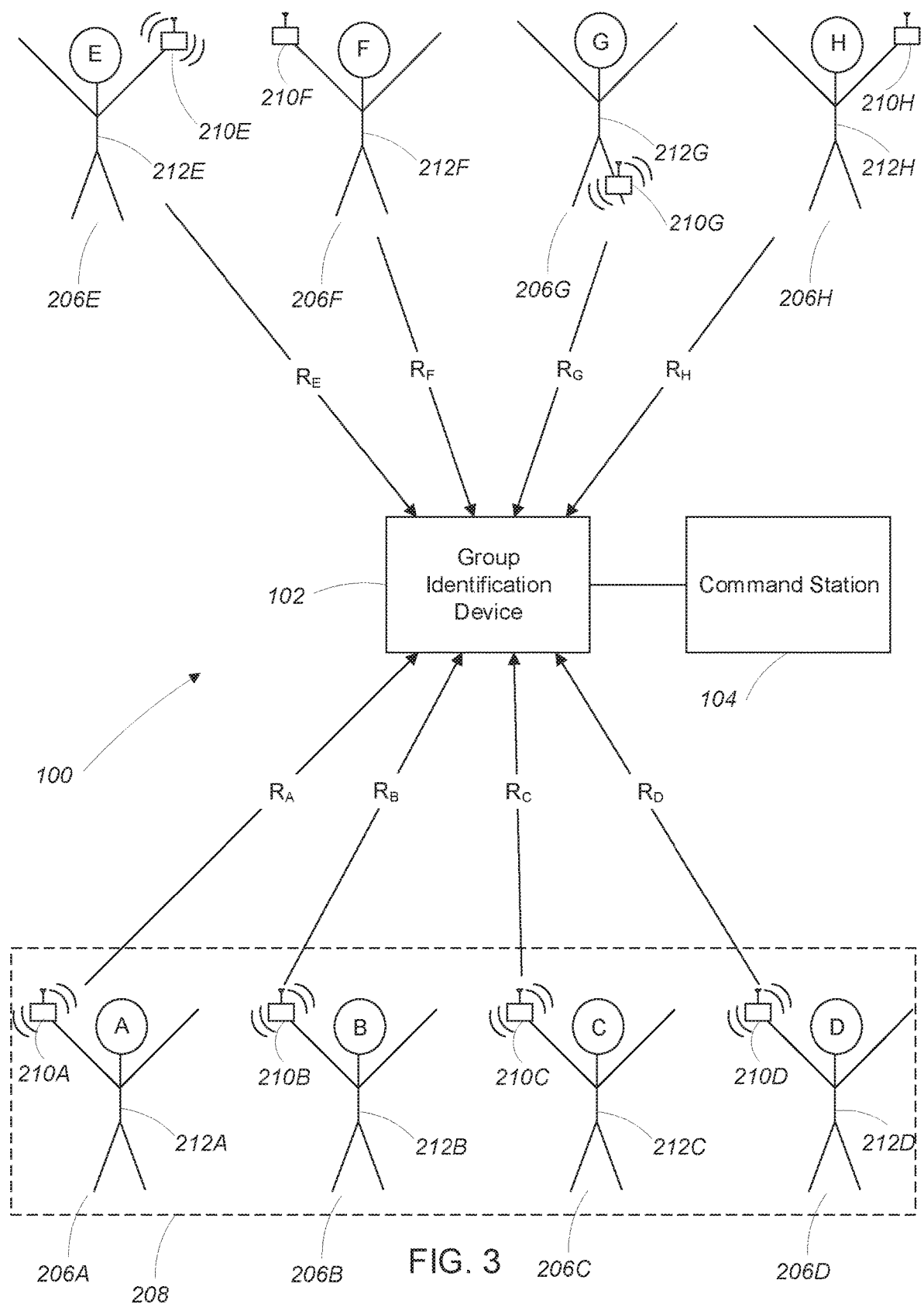
FIG. 3 is the group identification system of FIG. 1 receiving responses.

Referring to FIG. 3, in response to the challenge, C, the first solider 212A, the second soldier 212B, the third soldier 212C, and the fourth solider 212D all perform the physical routine by waving their right hand within the predefined time period, t. Motion data associated with the first soldier 212A, the second soldier 212B, the third soldier 212C, and the fourth soldier 212D performing the physical routine is recorded by the respective devices 210A-210D attached to those soldiers' bodies.

The fifth soldier 212E and the seventh soldier 212G also perform a physical routine, but the fifth soldier 212E and the seventh soldier 212G are not aware that the physical routine required to be authenticated into the first squad's group 208 includes waving their right hands. As a result, the fifth soldier 212E waves his left hand and the seventh soldier 212G shakes his left leg. Nonetheless, motion data associated with the fifth soldier 212D and the seventh soldier 212G performing their incorrect physical routines is recorded by the respective devices 210E, 212G attached to those soldiers' bodies.

The sixth soldier 212F and the eighth soldier 212H do not perform any physical routine. Motion data is still recorded for those soldiers by the respective devices 210F, 212H attached to their bodies.

At the end of the predefined time period, t, each of the devices 210A-210H transmits response data, R, to the group identification device 102 (e.g., via radio frequency or infrared communications). In some examples, the response data, R, includes a time sequence of encoded motion data points that was collected by the device during the predefined time period, t, and a public encryption key associated with the soldier-device pair that the device belongs to.

The group identification device 102 receives the responses, $R_A$-$R_H$, and analyzes the motion data in the responses to determine which soldier-device pairs are grouped together. In some examples, motion data from the responses, $R_A$-$R_H$, are compared to a template motion data associated with the physical routine to identify which soldier-device pairs performed the physical routine.

Figure 4:
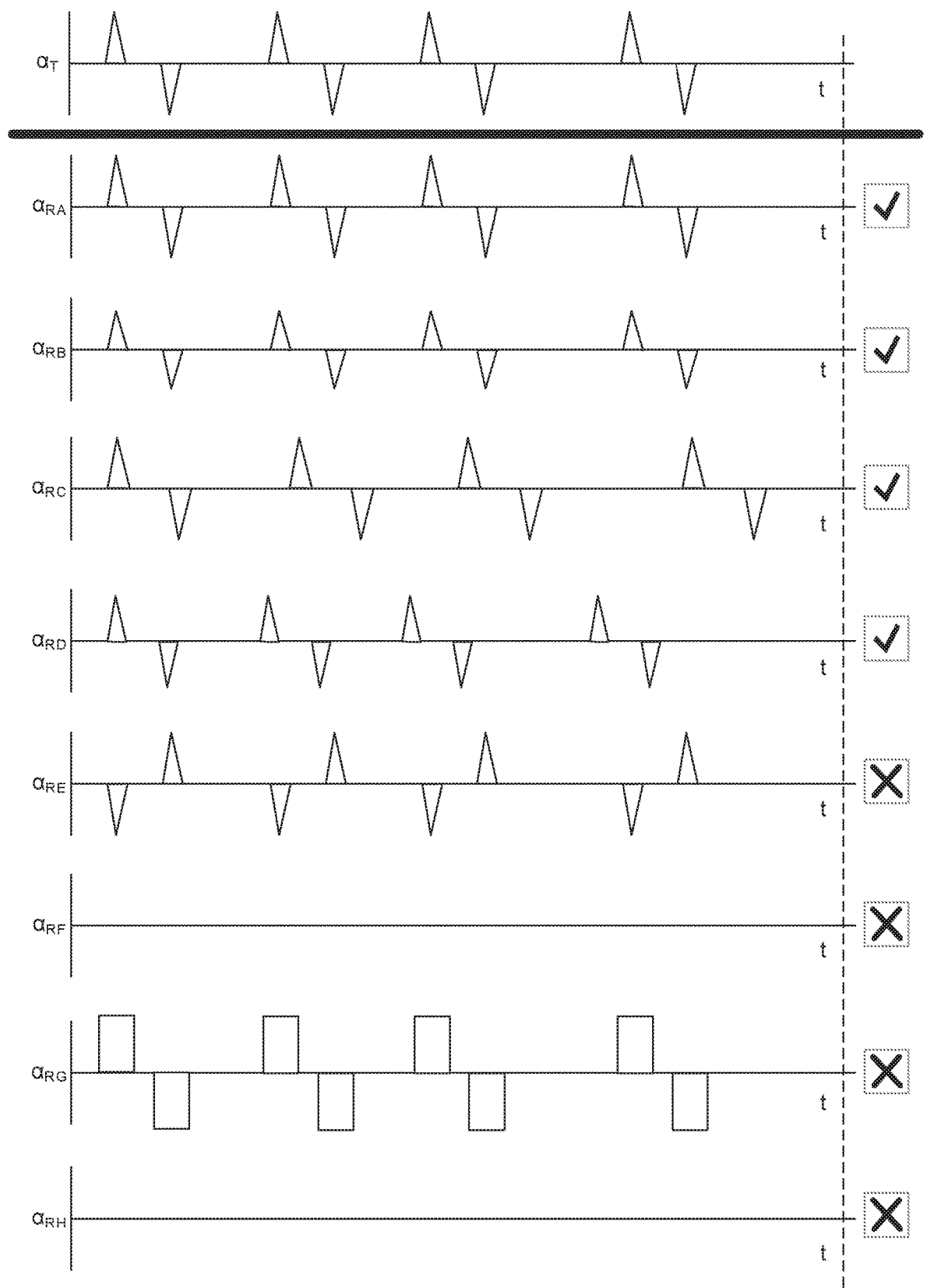
FIG. 4 is a comparison of data representing user motion.

For example, in FIG. 4, the motion data CRA-ORH from the responses, $R_A$-$R_H$, are compared to template motion data, CT, using a pattern matching scheme. In general, the pattern matching scheme allows for a degree of difference between matching motion data. For example, time scaling, amplitude scaling, and minor timing issues can exist between two sets of motion data and those sets may still be considered as matching by the by group identification device 102. In one examples, the comparison utilizes a similarity metric such as a mean squared difference of the motion data (where the motion data is possibly pre-processed to time align, warp, or rotate the motion data to compensate for device attachment problems).

In FIG. 4, the motion data from the first soldier-device pair 206A, $\alpha_{RA}$, the second soldier-device pair 206B, $\alpha_{RB}$, third soldier-device pair 206C, $\alpha_{RC}$, and the fourth soldier-device pair 206D, $\alpha_{RD}$ are identified as matching the template motion data, $\alpha_T$, by the group identification device 102, despite minor differences between the different sets of motion data and the template motion data. The group identification device 102 therefore determines that the first soldier 212A, the second soldier 212B, the third soldier 212C, and the fourth soldier 212D all performed the physical routine by waving their right hand and groups those soldiers into the first squad's group 208.

The fifth soldier 212E waved his left hand and the motion data for the fifth soldier-device pair 206E, $\alpha_{RE}$, is therefore 'flipped' relative to the template motion data, $\alpha_T$. The group identification device 102 determines the fifth soldier 212E did not perform the correct physical routine and excludes the fifth soldier 212E from the first squad's group 208.

The seventh soldier 212G shook his left leg and the motion data for the seventh soldier-device pair 206G, $\alpha_{RG}$, is therefore significantly different from the template motion data, $\alpha_T$. The group identification device 102 determines the seventh soldier 212G did not perform the correct physical routine and excludes the seventh soldier 212G from the first squad's group 208.

The sixth soldier 212E and the eighth soldier 212H did not perform any physical routine, so the motion data for the sixth soldier-device pair 206E, $\alpha_{RE}$, and the eighth soldier-device pair 206H, $\alpha_{RH}$, is also significantly different from the template motion data, $\alpha_T$. The group identification device 102 determines the sixth soldier 212E and the eighth soldier 212H did not perform the correct physical routine and excludes them from the first squad's group 208.

Figure 5:
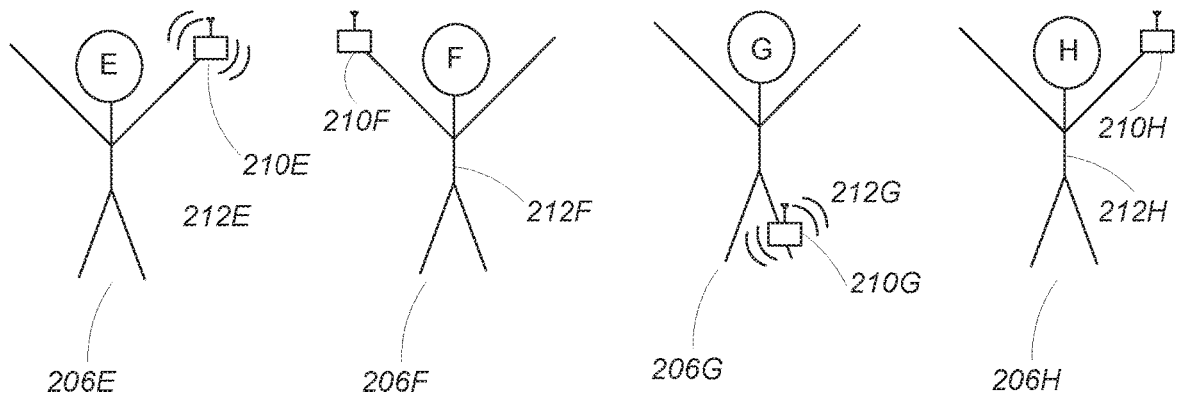
FIG. 5 is the group identification system of FIG. 1 issuing encryption keys to users identified as belonging to a group.
Figure 5:
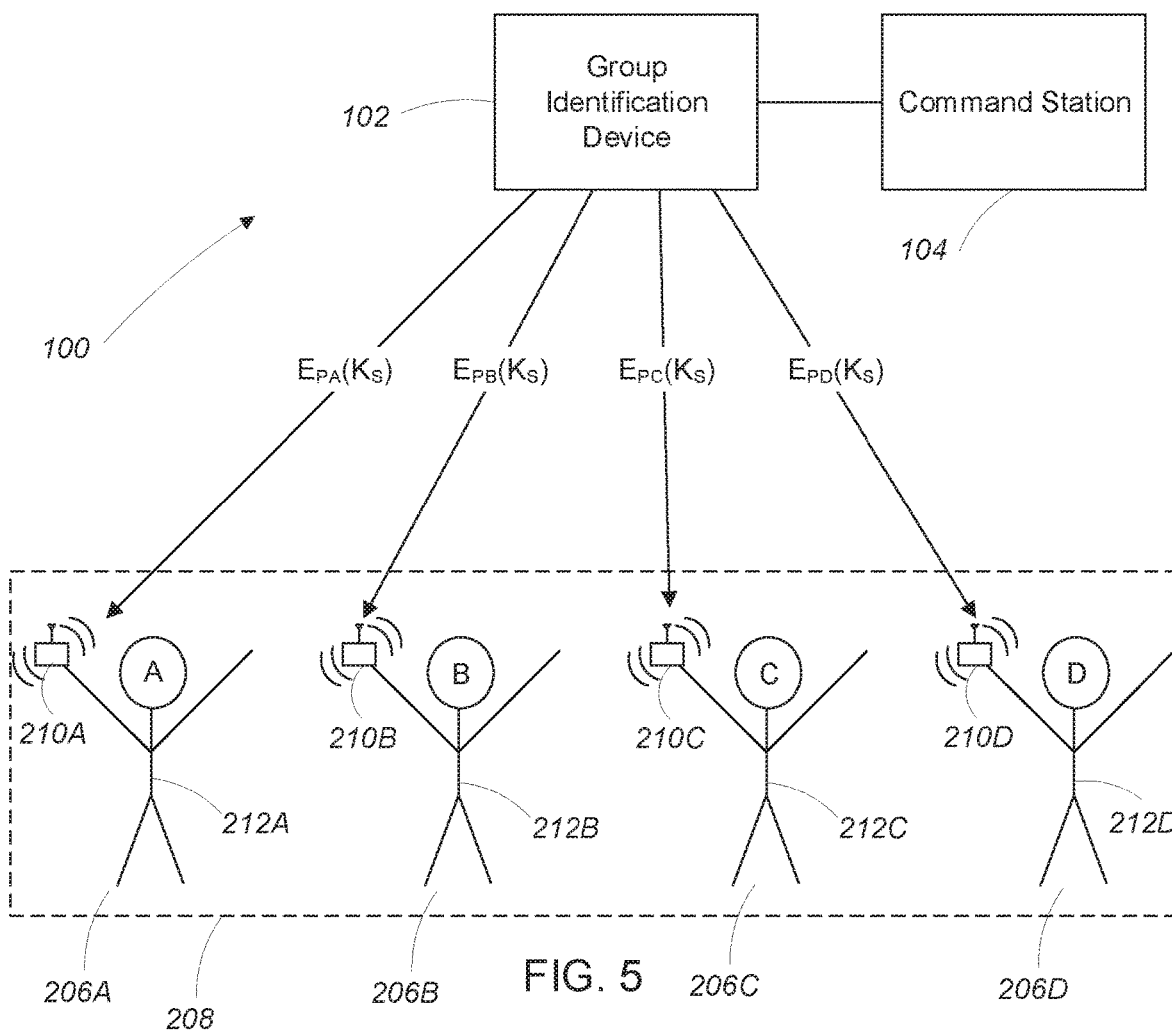

Referring to FIG. 5, after determining that the first soldier-device pair 206A, the second soldier-device pair 206B, third soldier-device pair 206C, and the fourth soldier-device pair 206D belong to the first squad's group 208, the group identification device 102 encrypts a symmetric encryption key with the public keys (obtained from responses $R_A$-$R_D$) associated with each soldier-device pair in the first squad's group 208. The encrypted symmetric keys $E_{PA}(K_S)$, $E_{PB}(K_S)$, $E_{PC}(K_S)$, $E_{PD}(K_S)$, are transmitted to the soldier-device pairs belonging to the first squad's group 208. The first soldier-device pair 206A receives the symmetric key encrypted with its public key and decrypts the symmetric key using its private key. The symmetric key is the usable by the device 210A (e.g., a radio or telephone) to access an encrypted communication channel associated with the first squad's group 208. Similarly, the second, third, and fourth soldier-device pairs 206B-206C receive the symmetric key encrypted with their respective public keys and decrypt the symmetric using their respective private keys. The symmetric key is usable by the devices 210C-210D to access the encrypted communication channel associated with the first squad's group 208.

3 Group Polling

Figure 6:
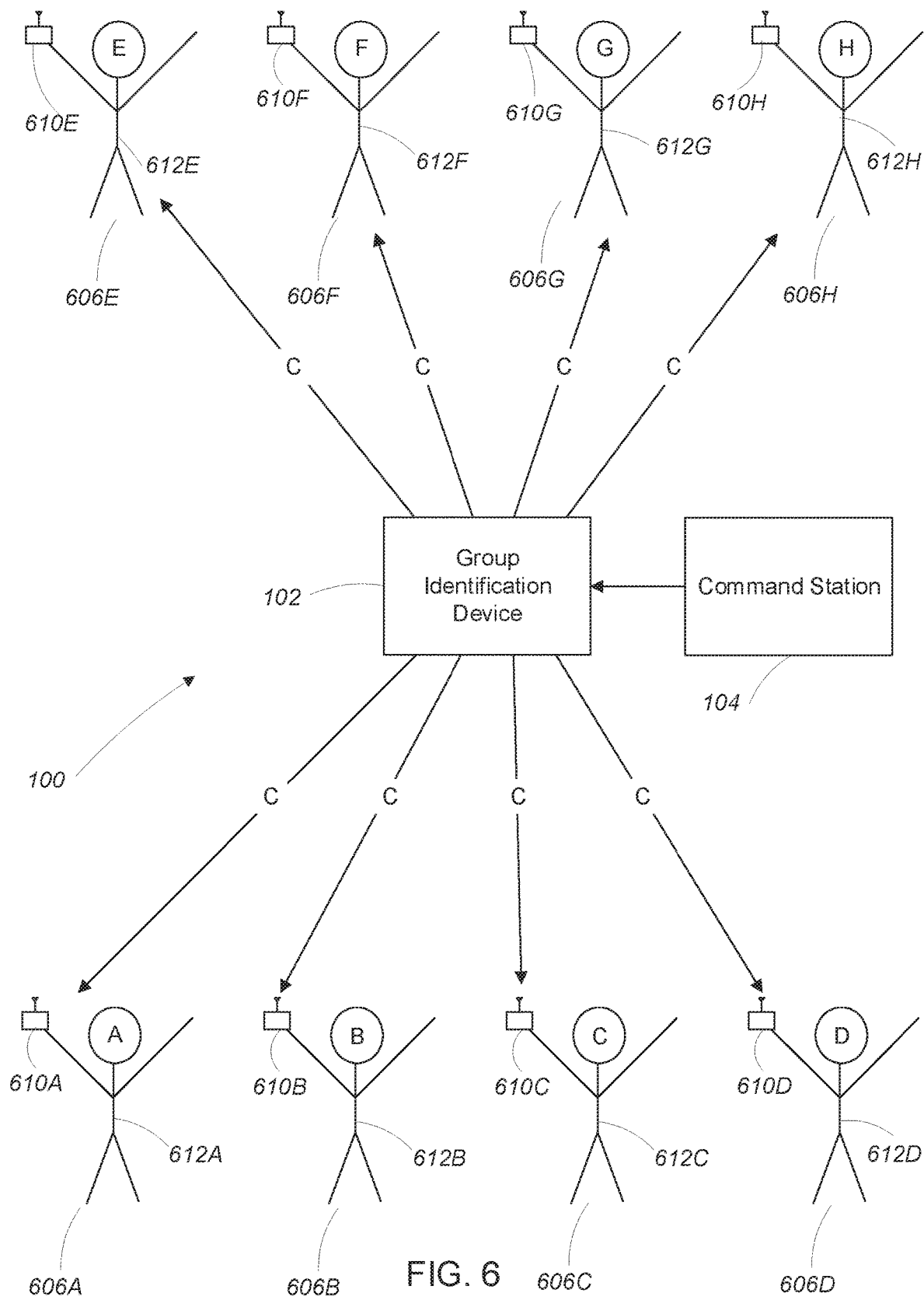
FIG. 6 is the group identification system of FIG. 1 issuing a challenge in a second application.

Referring to FIG. 6, in another application, the group identification system 100 is used to poll user-device pairs 606A-606H to determine whether any of the users 612A-612H are incapacitated, separated from their respective devices 610A-610H, or otherwise unable to perform a predetermined physical routine. For example, firefighters fighting a forest fire may be periodically challenged and required to perform the predetermined physical routine. If the group identification device 102 determines that any of the firefighters did not perform the predetermined physical routine, then an alarm is raised indicating that that the non-responsive firefighter may be incapacitated.

Continuing with the firefighter example, in FIG. 6 a user (not shown) initiates broadcast of a challenge, C, using the command station 104. The challenge signals, to the firefighter-device pairs 606A-606H, that the firefighters must perform a predetermined physical routine within a predefined time period, t, after receiving the challenge. Any firefighters that do not perform the physical routine within the predefined time period, t, is considered to be incapacitated and in need of rescue. As was the case above, one example of the challenge, C, is the blowing of an air horn. But, other examples are possible including but not limited to a signal that causes each firefighter's device to buzz or emit a sound, an audible command such as "Check In!," a visual command such as a blinking light, or any other signal suitable to elicit a response from the firefighter-device pairs.

Figure 7:
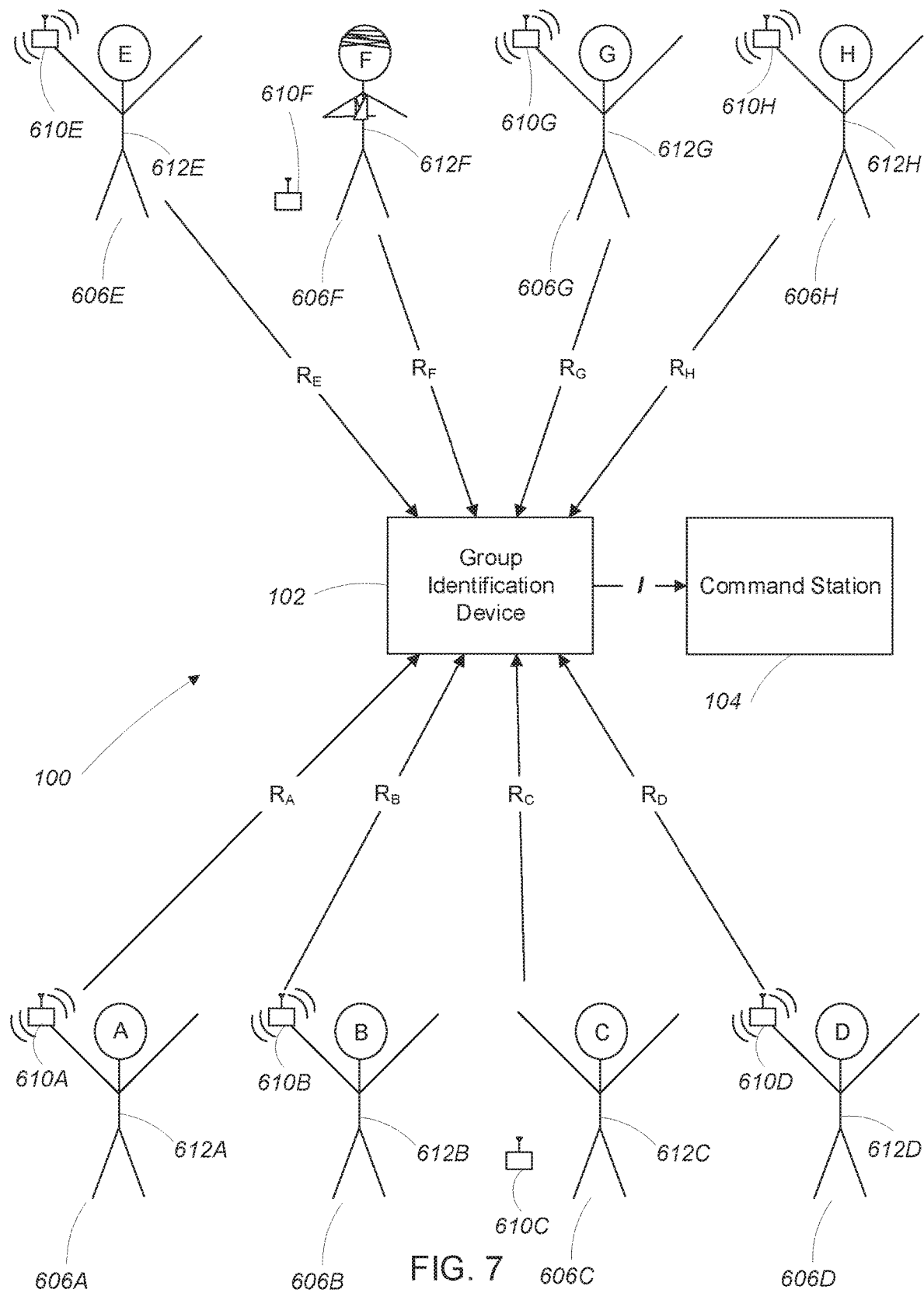
FIG. 7 is the group identification system of FIG. 6 receiving responses.

Referring to FIG. 7, in response to the challenge, C, the physical routine is performed by a first firefighter 612A of a first firefighter-device pair 606A, a second firefighter 612B of a second firefighter-device pair 606B, a fourth firefighter 612D of a fourth firefighter-device pair 606D, a fifth firefighter 612E of a fifth firefighter-device pair 606E, a seventh firefighter 612G of a seventh firefighter-device pair 606G, and an eighth firefighter 612H of a eighth firefighter-device pair 606H. Motion data associated with the first firefighter 612A, the second firefighter 612B, the fourth firefighter 612D, the fifth firefighter 612E, the seventh firefighter 612G, and the eighth firefighter 612H performing the physical routine is recorded by the respective devices 610 attached to those firefighter's bodies.

A third firefighter 612C of a third firefighter-device pair 606C is separated from his radio and therefore does not perform the physical routine. A sixth firefighter 612F of a sixth firefighter-device pair 606F is injured and does not perform the physical routine. Motion data is still recorded for those firefighters by the respective devices.

At the end of the predefined time period, t, each of the devices 610A-610H transmits response data, R, to the group identification device 102 (e.g., via radio frequency or infrared communications). In some examples, the response data, R, includes a time sequence of encoded motion data that was collected by the device during the predefined time period, t, an identifier associated with the device or the firefighter-device pair, and in some examples, a most recent GPS coordinate for the firefighter-device pair.

The group identification device 102 receives the responses, $R_A$-$R_H$, and analyzes the motion data in the responses to determine which firefighter-device pairs have responded and are safe. As was described above, motion data from the responses, $R_A$-$R_H$, are compared to template motion data associated with the physical routine to identify which firefighter-device pairs performed the physical routine.

In this case, the group identification device 102 identifies the third firefighter-device pair 606C and the sixth firefighter-device pair 606F as being nonresponsive and sends a message, I, to the command station 104 indicating the status of the firefighters-device pairs.

Figure 8:
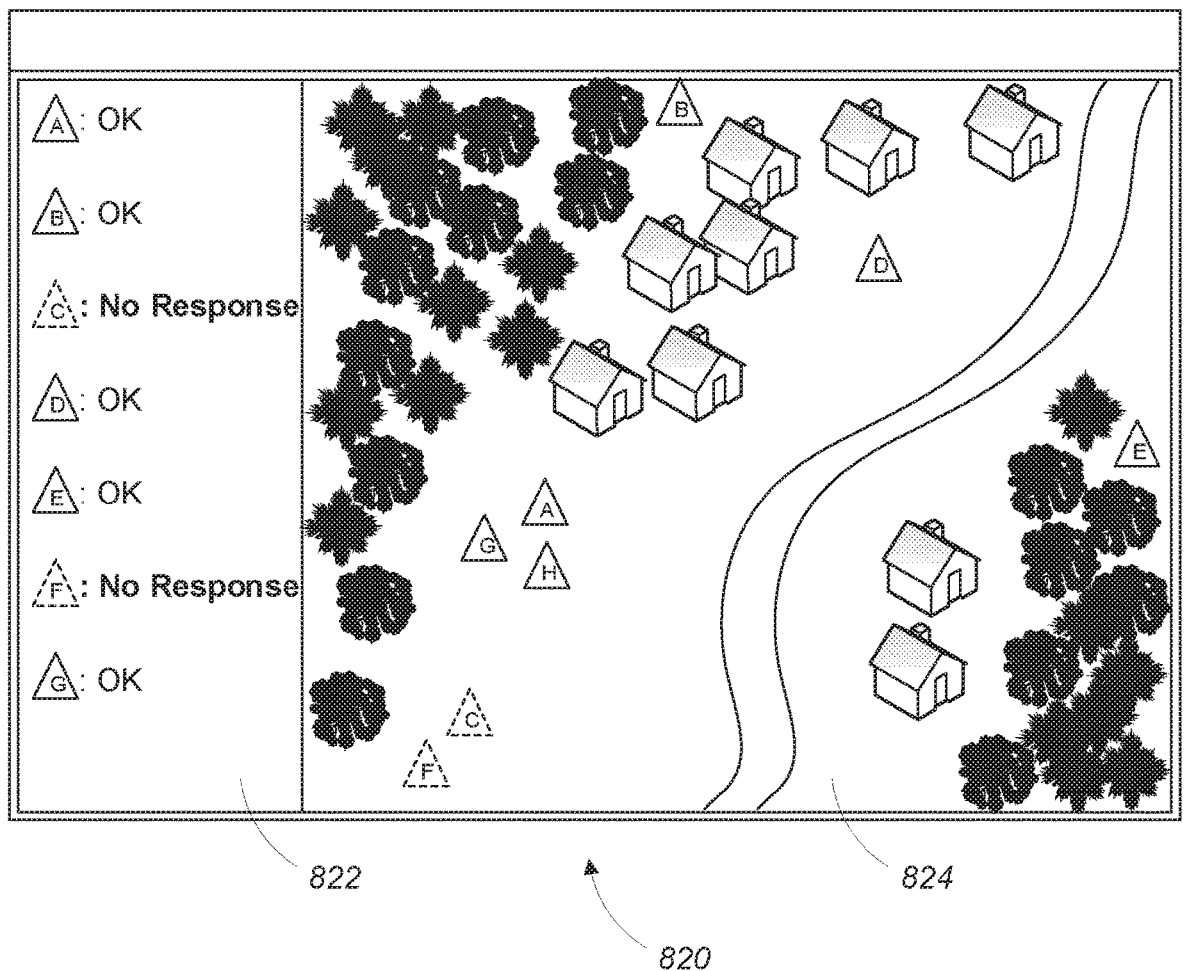
FIG. 8 is a user interface for displaying a status of users.

Referring to FIG. 8, the message, 1, is received at the command station 104 and a user interface 820 is used to display the status of the firefighter-device pairs. In one example, the user interface includes a status pane 822 indicating whether, for each of the firefighter-device pairs 606A-606H, the physical routine was successfully performed, and a map view 824 indicating the last known location for the firefighter-device pairs. The user interface can be used to quickly identify incapacitated firefighters and dispatch rescue teams to the last known location of the incapacitated firefighters.

4 Alternatives

The techniques described above can be used in a number of military and non-military applications. In some examples, the techniques can be used to track a status of soldiers on a battlefield. In one commercial example, a group of students participating in an online exercise class can join a competition (e.g., a spinning bike race or a row machine race) by performing a physical routine according to the techniques described above. A display (e.g., a leaderboard) for the competition is available only to those students that have successfully joined the competition. Such a group may or may not require encrypted communications.

Sports teams are another type of organization that can use the techniques described herein. For example, in a match between two teams (e.g., soccer, football, baseball) participating in an event (e.g., a match or game), players can contemporaneously use the group identification system to join groups associated with their corresponding teams. In some examples, a competition may include multiple teams (e.g., multiple cycling teams or multiple rowing teams). Again, members of the teams can contemporaneously use the group identification system to join groups associated with their corresponding teams. Information such as health status is then available to those within a particular team group (e.g., teammates and coaches) and not available to those not within the particular team group (e.g., opposing teammates and coaches).

The devices described above use accelerometers to sense and record motion data. But any other type of device that is able to sense and record physical data can be used. For example, force sensors, biometric sensors (e.g., heart rate sensors, blood gas sensors, etc.) and/or a radar sensor can also be used. In some examples, one or more of the users has multiple devices which are able to measure both the aspects about the individual and the environment. For example, in a fitness setting, a user may have a fitness watch and a smart spinning or rowing machine that are both able to provide data usable by the group identification system. In a military setting, a soldier may have a health device (e.g., a biometric sensor) and a radiation/atmosphere monitor which are both capable of collecting and providing data usable by the group identification system.

In the examples described above, the group identification device stores data representing an expected time sequence of motion data corresponding to the physical routine (i.e., a template) and compares that stored data to motion data received from the users to determine if those users have performed the physical routine. But, in some examples, the group identification device does not store data representing an expected time sequence of motion data corresponding to the physical routine. Instead, motion data received from the various users is compared against itself to identify users that have performed the same motion and then group those users together. Doing so avoids the requirement that a pre-stored template is used.

In the examples above, the physical routine was described as a simple wave of the hand. But, other physical routines such as a dancing, whistling, jumping up and down, paced breathing, gesturing, muscle tension, heartbeat, eye blinking, hand movement, clapping and so on.

While the examples above describe distribution of a symmetric key using public key cryptography, any other suitable key distribution scheme can be used.

The techniques described above use a centralized group identification device to determine which users performed the physical routine within the predefined time period after issuance of the challenge. But in some examples, a decentralized scheme is implemented where the techniques implemented in the group identification device are replicated at the devices of each user-device pair.

In some examples, multiple groups can be identified at one time. For example, two different groups of users may perform two different physical routines, resulting in two groups of users.

The challenge need not be initiated by the control station, nor does it need to emanate from the group identification device. For example, a user or another person could simply blow an air horn. In some examples, the challenge need not be actively issued. For example, the challenge could simply be a requirement that the users performed a physical routine at a particular time of day.

In FIGS. 1-3 and 5-7, directional arrows are used to illustrate transmission of data (e.g., responses, encrypted keys, and the challenge). The directional arrows in the figures should be understood as being generic to both broadcast and point-to-point transmissions. That is, in some examples, the challenge, the responses, and the encrypted keys are broadcast, while in other examples, the challenge, the responses, and the encrypted keys are transmitted over point-to-point links.

In some examples, the word "device" as it is used herein refers to a single device (e.g., a smartphone), while in other examples "device" refers to a number of possibly mutually authenticated devices associated with a user (e.g., a biometric monitor that is mutually authenticated with a smartphone in a body-area network).

It is to be understood that the foregoing description is intended to illustrate and not to limit the scope of the invention, which is defined by the scope of the appended claims. Other embodiments are within the scope of the following claims.

What is claimed is:

1. A computer implemented method for authenticating a group of users from a plurality of users using a shared secret comprising a secret physical routine, the method comprising:
    sharing the shared secret with a first subset of users of the plurality of users prior to issuance of the challenge, wherein the users in the first subset of users are each required to perform the secret physical routine within the prescribed time period after issuance of the challenge to be identified as members of the group of users;
    causing issuance of a challenge to the plurality of users, the challenge including one or more of an audible challenge, a tactile challenge, a visual challenge, and a temporal challenge;
    receiving, for each user of the plurality of users, response data including motion data characterizing motion of the user and a unique identifier of the user, the motion of the user occurring during a prescribed time period occurring after issuance of the challenge to the plurality of users;
    processing, using computing circuitry, the motion data of the plurality of users to identify the first subset of users of the plurality of users with substantially matching motion data; and
    authenticating, using the computing circuitry, the group of users including forming the group of users to include the first subset of the plurality of users and for each user of the plurality of users in the first subset, distributing a cryptographic key to the user based on the unique identifier associated with the user.

2. The method of claim 1 wherein processing the motion data includes comparing the motion data to a motion data template and including users with motion data that substantially matches the motion data template in the first subset of the plurality of users.

3. The method of claim 1 wherein processing the motion data includes comparing the motion data associated with each user with the motion data associated with other users.

4. The method of claim 1 wherein the secret physical routine includes one or more of dancing, whistling, jumping up and down, paced breathing, gesturing, muscle tensing, heart rate modulation, eye blinking, hand movement, clapping, and waving.

5. The method of claim 1 wherein processing the motion data includes performing a pattern matching procedure.

6. The method of claim 1 wherein processing the motion data includes determining a similarity metric for the motion data.

7. The method of claim 6 wherein determining the similarity metric includes determining a mean squared difference between the motion data.

8. The method of claim 1 further comprising pre-processing the motion data including one or more of time aligning the motion data, warping the motion data, or rotating the motion data.

9. The method of claim 1 wherein the cryptographic key is encrypted such that users in the first subset of users are able to decrypt the encrypted cryptographic key.

10. The method of claim 1 wherein each user of the plurality of users is associated with a corresponding device, the corresponding device configured to collect the motion data for the user, form the response data for the user, and transmit the response data.

11. The method of claim 10 wherein the corresponding device includes one or more sensors.

12. The method of claim 11 wherein the one or more sensors include an accelerometer.

13. The method of claim 12 wherein the motion data includes acceleration data.

14. The method of claim 11 wherein the corresponding device includes one or more of a biometric sensor, a radar sensor, a force sensor, an acoustic transducer, and a light sensor.

15. The method of claim 1 further comprising determining that at least some users of the plurality of users that were expected to be in the first subset of users were not identified as being part of the first subset of users.

16. The method of claim 1 further comprising excluding one or more users of the plurality of users from the group based on the one or more users not being identified as part of the first subset of users.

17. A system for authenticating a group of users from a plurality of users using a shared secret comprising a secret physical routine, the system comprising:
    a group authentication device including
        an output for issuing a challenge to the plurality of users, the challenge including one or more of an audible challenge, a tactile challenge, a visual challenge, and a temporal challenge;
        an input for receiving, for each user of the plurality of users, response data including motion data characterizing motion of the user and a unique identifier of the user, the motion of the user occurring during a prescribed time period occurring after issuance of the challenge to the plurality of users; and
        computing circuitry configured to process the motion data of the plurality of users to identify a first subset of users of the plurality of users with substantially matching motion data, and authenticate the group of users, the authenticating including forming the group of users to include the first subset of the plurality of users and for each user of the plurality of users in the first subset, distributing a cryptographic key to the user based on the unique identifier associated with the user;
    wherein the shared secret is shared with the first subset of users of the plurality of users prior to issuance of the challenge and the users in the first subset of users are each required to perform the secret physical routine within the prescribed time period after issuance of the challenge to be identified as members of the group of users.

18. The method of claim 17 wherein the challenge includes one or more of an audible challenge, a tactile challenge, a visual challenge, and a temporal challenge.

* * * * *